United States Patent [19]
Boyum et al.

[11] 4,411,070
[45] Oct. 25, 1983

[54] TREE-TRIMMING APPARATUS

[75] Inventors: George A. Boyum, North Mankato; Robert A. Renner, Mankato; Ralph Lovelace, Edina, all of Minn.

[73] Assignee: Jarraff Industries, Inc., North Mankato, Minn.

[21] Appl. No.: 304,840

[22] Filed: Sep. 23, 1981

Related U.S. Application Data

[63] Continuation of Ser. No. 132,535, Mar. 21, 1980, abandoned.

[51] Int. Cl.³ ............................................. B27L 1/00
[52] U.S. Cl. .................................... 30/379.5; 91/525; 144/2 Z; 56/11.9; 56/233; 83/928; 212/238; 212/264; 414/694
[58] Field of Search .................... 212/238, 261, 264; 414/690, 694; 91/525, 526, 443; 56/10.7, 233, 237, 11.9; 30/379.5; 83/928; 144/3 D, 2 Z, 34 R, 343

[56] References Cited

U.S. PATENT DOCUMENTS

| | | | |
|---|---|---|---|
| 3,032,956 | 5/1962 | Mullet | 56/25.4 |
| 3,343,575 | 9/1967 | Trout | 144/34 R |
| 3,785,705 | 1/1974 | Binger et al. | 83/928 |
| 4,063,359 | 12/1977 | Luscombe | 30/379.5 |
| 4,241,565 | 12/1980 | Parsons, Jr. | 56/233 X |

*Primary Examiner*—W. D. Bray
*Attorney, Agent, or Firm*—Merchant, Gould, Smith, Edell, Welter & Schmidt

[57] ABSTRACT

A tree-trimming apparatus mounted on a mobile support vehicle. The apparatus includes a telescoping boom pivotally mounted on a pedestal. The pedestal is pivotally mounted to a turntable which is rotatably mounted on the support vehicle. An operator's station is mounted on the pedestal to provide control of the apparatus. A large diameter circular saw is mounted at the end of the boom and is powered by a high speed hydraulic motor to provide high cutting efficiency. A fiberglass boom and electrically non-conductive hoses provide maximum safety for the operator.

44 Claims, 8 Drawing Figures

TREE-TRIMMING APPARATUS

This is a continuation of application Ser. No. 132,535, filed Mar. 21, 1980 and now abandoned.

TECHNICAL FIELD

This invention relates generally to tree-trimming apparatus and more particularly to mobile trimming apparatus having a circular saw mounted at the end of an extensible boom.

BACKGROUND OF THE PRIOR ART

A common problem associated with electric utility lines, pipelines, highways, and railroads is that of trees or other plant growth encroaching into the right of way. This encroachment interferes with the activity occurring within the right of way. To alleviate this problem, various methods have been used to clear right of ways of this unwanted growth. A truck has been used in which men are put into a bucket and raised by means of a boom to the area of the unwanted growth. By hand or power saw the men cut the growth from the right of way. This method is undesirable for a number of reasons. First, it is necessary to raise a man off the ground up to the area of the unwanted growth. This can be dangerous in any situation but is especially so in the situation where tree limbs are being trimmed from the area around power lines. A chance of eletrocution exists even if extreme caution is used. Secondly, each time the growth within reach of the bucket is trimmed the bucket must be lowered to its traveling position and the truck moved to the next site. Then it is necessary to again raise the bucket into position for trimming the trees. The setup involved with this process is very time-consuming and consequently this method is undesirable for most right of way clearing applications.

Other devices have been proposed which alleviate some of the problems associated with right way of clearing. It has been proposed to mount some kind of cutting device on the end of a retractable boom which can be controlled by an operator on or near the ground. This boom device is then mounted on a vehicle to give the cutting apparatus mobility. However, these prior devices have all contained one or more undesirable aspects which limit their effective use as a right of way clearing device. For example, many of these devices are constructed so that the boom has a very limited reach. Therefore, these cutting apparatus are ineffective for clearing right of ways where there is very tall tree growth necessitating a long reach. When attempts have been made to extend the reach of the boom in these devices other undesirable side effects have been produced. The extended boom length has added greatly to the weight of the cutting apparatus and it has been necessary to stabilize the device by using outriggers mounted on the sides of the vehicle on which the cutting apparatus is carried. Each time the device is moved the outriggers must be lowered into their stabilizing position. This greatly increases the setup time and thus lowers the efficiency of the device.

Another problem that must be faced when clearing the right of way for high voltage utility lines is that of the potential for electric shock should the boom come into contact with the power lines. The prime objective in this situation is to provide the maximum amount of safety for the operator of the cutting apparatus. Prior art boom tree trimming devices have been unsatisfactory in this respect in that they have been comprised of materials which provide an electrically conductive path between the high voltage lines and the operator. Thus, it has not been safe to use these tree-trimming devices in the proximity of high voltage lines.

BRIEF SUMMARY OF THE INVENTION

In order to solve some of the above-mentioned problems associated with right of way clearing devices the present invention is proposed. My invention comprises a mobile support vehicle, preferably all-wheel drive. Mounted upon the support vehicle is a turntable rotatable about a vertical axis. Means are provided for imparting rotational motion to the turntable. A pedestal is pivotally mounted about a horizontal axis on the turntable and means is provided for imparting a pivotal motion to the pedestal. A boom is mounted on the pedestal and pivots about an axis normal to the horizontal axis defining the pivotal motion of the pedestal. Means are provided for imparting the pivotal motion to the boom. Mounted on the end of the boom is a cutting means including means for imparting cutting motion.

The tree-trimming apparatus is controlled from an operator's station mounted on one side of the pedestal. The operator's station is comprised of an operator's chair and a control panel, from which all of the functions of the apparatus are controlled. A particular advantage is realized by allowing the pedestal to tilt, which enables the operator to maintain the operator's station in an upright and level position even on uneven terrain.

My invention provides significant advantages over the devices which have heretofore been used to clear right of ways. The boom is constructed from a lightweight electrically nonconductive flexible material such as fiberglass. Although portions of the booms on some utility trucks have been constructed of non-conductive material, it is believed that this is the only tree-trimming apparatus capable of utilizing a boom constructed entirely of fiberglass. This construction is lightweight and allows the tree-trimming apparatus to be used without the necessity of outriggers mounted on the truck for stabilization. The electrically nonconductive boom also provides a safer working environment for the operator since there is no conductive path between the end of the boom and the operator.

The fiberglass construction also provides the boom with flexibility, allowing it to withstand any impacts which could occur during its use. A high-speed hydraulic motor is provided to power a large diameter circular saw mounted at the end of the boom. This results in a very high tangential velocity or tooth speed permitting cuts to be made with ease. Consequently, the cutting time required per tree is decreased, thus increasing the number of trees which can be cut in a given length of time.

Various advantages and features of novelty which characterize the invention are pointed out with particularity in the claims annexed hereto and forming a part hereof. However, for a better understanding of the invention, its advantages, and objects obtained by its use, reference should be had to the drawings which form a further part hereof, and to the accommpanying descriptive matter, in which there is illustrated and described a preferred embodiment of the invention.

DETAILED DESCRIPTION OF THE INVENTION

Figure 1:
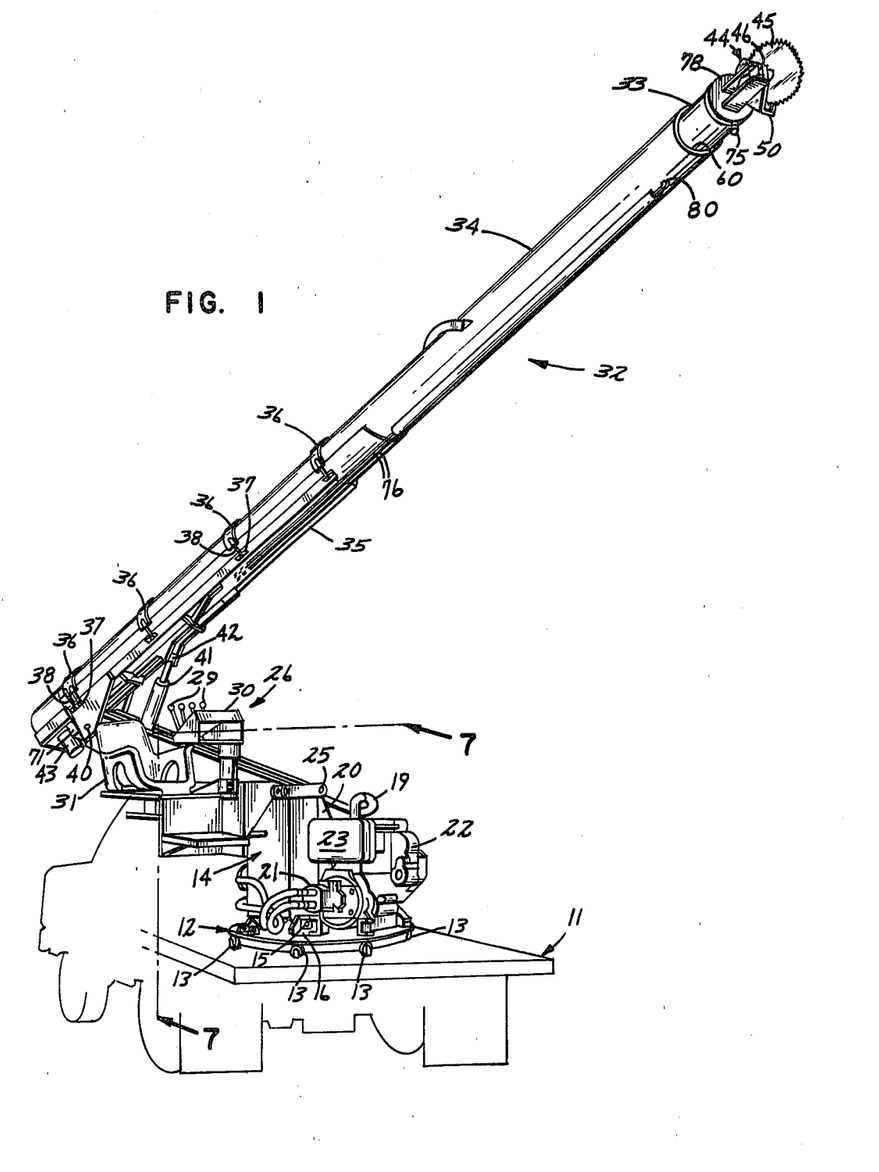
FIG. 1 is a perspective view of the tree-trimming apparatus mounted on a mobile carrier showing the boom partially elevated.
Figures 2, 7:
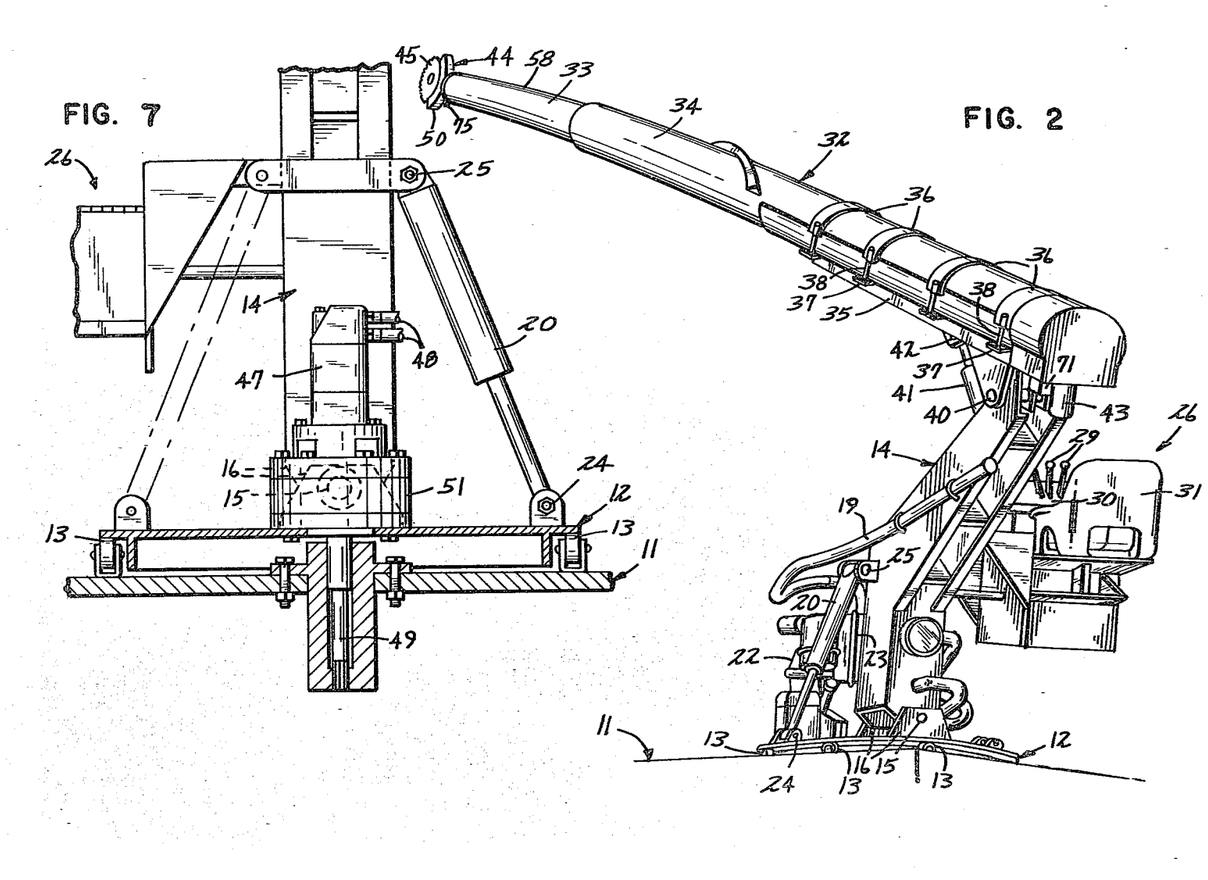
FIG. 2 is a perspective view of the rear of the tree-trimming apparatus showing the boom partially elevated.
FIG. 7 is a partial sectional view of the tree-trimming apparatus taken generally along line 7—7 of FIG. 1 showing the turntable drive assembly.

The construction of the tree-trimming apparatus can be understood with reference to FIGS. 1 and 2. The tree-trimming apparatus is mounted upon a mobile support vehicle 11. Mobile support vehicle 11 is preferably all wheel drive to enable it to travel over the rough terrain associated with many right of ways. Rotatably mounted upon support vehicle 11 is a turntable 12. Turntable 12 is supported by rollers 13 permanently affixed to support vehicle 11.

Mounted upon turntable 12 is a pedestal 14. Pedestal 14 is pivotally mounted about a horizontal axis defined by pin 15 which secures pedestal 14 to mounting brackets 16. Mounting brackets 16 are permanently affixed to turntable 12 in any conventional manner. Pivotal motion is supplied to pedestal 14 by means of a hydraulic cylinder 20, which is pivotally mounted at point 24 to turntable 12 and at point 25 to the pedestal 14. Cylinder 20 is supplied with fluid under pressure from a pump 21 connected to cylinder 20 by conduit not shown. In the preferred embodiment, all of the hydraulic conduit used in the tree-trimming apparatus is electrically non-conductive in order to provide the maximum amount of electrical isolation possible should the apparatus come into contact with power lines. Pump 21 is affixed to and driven by a suitable engine 22, preferably a diesel engine, which is exhausted through pipe 19. Diesel fuel for engine 22 is stored in tank 23.

An operator's station 26 is affixed to one side of pedestal 14. Operator's station 26 comprises a control panel 30 and an operator's chair 31. Control levers 29 are mounted on control panel 30 and provide the operator with control over the positioning movements of the tree-trimming apparatus. In the preferred embodiment, operator's station 26 is attached to pedestal 14 entirely by electrically non-conductive material isolating the operator from the rest of the tree-trimming apparatus.

Mounted at the end of pedestal 14 is a boom carriage 35 which cradles boom 32. In the preferred embodiment shown in the FIGURES the boom 32 consists of an inner boom member 33 telescopically mounted inside an outer boom member 34. Boom 32 is attached to boom carriage 35 by metal straps 36 which are secured to flanges 37 by bolts 38. Boom carriage 35 is pivotally mounted to pedestal 14 at point 40. Pivotal motion is imparted to the boom by cylinder 41 which is pivotally connected to boom carriage 35 at point 42 and to pedestal 14 at a point 39. Cylinder 41 is supplied with fluid under pressure from pump 21 through conduit not shown. Boom extending and retracting motion is powered by hydraulic motor 43 which is supplied with fluid under pressure from pump 21 by conduit not shown. A more detailed description of the boom extending and retracting mechanism is contained hereafter.

Mounted at the end of inner boom member 33 is cutting assembly 44. Cutting assembly 44 consists of a circular saw 45 powered by a hydraulic motor 46 which is supplied with fluid under pressure by pump 21. A saw guard 50 is supplied to help eliminate the possibility of debris being thrown backwards in the direction of the operator. Guard 50 is designed so that it allows a maximum amount of the cutting surface of circular saw 45 to be exposed while still affording protection to the operator. In the preferred embodiment of the invention at least 240° of the circumferential surface of circular saw 45 is unshielded by guard 50. This large saw blade exposure increases the efficiency of the tree-trimming apparatus. For example, in a typical cutting sequence the boom could be raised to cut a limb above it using the top of circular saw 45 as the cutting surface. A lower limb could then be cut by lowering the boom and using the bottom of circular saw 45 as the cutting surface. Next, a limb farther away could be cut by extending the boom and using the front edge of circular saw 45 as the cutting surface. This variety of useable cutting surfaces allows many limbs to be cut in a short period of time. A more detailed description of the operation of cutting assembly 44 follows hereafter with reference to FIGS. 3-6.

The system for rotating turntable 12 can be understood with reference to FIG. 7. A hydraulic motor 47 mounted on turntable 12 supplies the power for imparting rotational motion to turntable 12. Hydraulic motor 47 receives fluid under pressure from pump 21. Conduits 48 provide the path through which fluid is supplied from and returned to pump 21. A shaft 49 extends from motor 47 through a spring loaded pressure off brake 51 to a fixed point on support vehicle 11 where it is held secure. As rotational motion is imparted by hydraulic motor 47 it causes turntable 12 to rotate since shaft 49 is secured to support vehicle 11. Reduction of rotational speed is achieved by use of a standard planetary gearing system not shown, but connected between motor 47 and shaft 49 within the housing of brake 51. Spring loaded pressure off brake 51 is provided as an additional safety measure. Brake 51 allows turntable rotation only when adequate fluid pressure is being received by motor 47. When motor 47 is off or should a conduit failure occur during its use, brake 51 is applied to prohibit further rotation of turntable 12.

The operation of the cutting assembly 44 and boom 32 can be understood with reference to FIGS. 3, 4, 5 and 6. Inner boom member 33 is telescopically mounted within outer boom member 34 by use of annular bearing members 60 and 61. In the preferred embodiment bearing members 60 and 61 are fabricated from an ultra-high molecular weight polyethylene material which provides a smooth slidable contact surface between boom members 33 and 34. Bearing member 60 is firmly bonded to outer boom member 34 and has an inner circumferential opening slightly larger than the circumference of inner boom member 33. A longitudinal alignment element 58 attached to the outer circumferential surface of inner boom member 33 mates with a keyway 59 formed in bearing member 60 in order to maintain rotational alignment between boom members 33 and 34. Bearing member 61 is firmly bonded to the outer circumferential surface of inner boom member 33 and has an outer circumferential dimension smaller than the inner circumferential dimension of outer boom member 34. The dimensions of bearings 60 and 61 are sized so that inner boom member 33 is allowed to move freely within outer boom member 34 while maintaining a firm fit between surfaces so that control of the boom is maintained.

Figure 3:
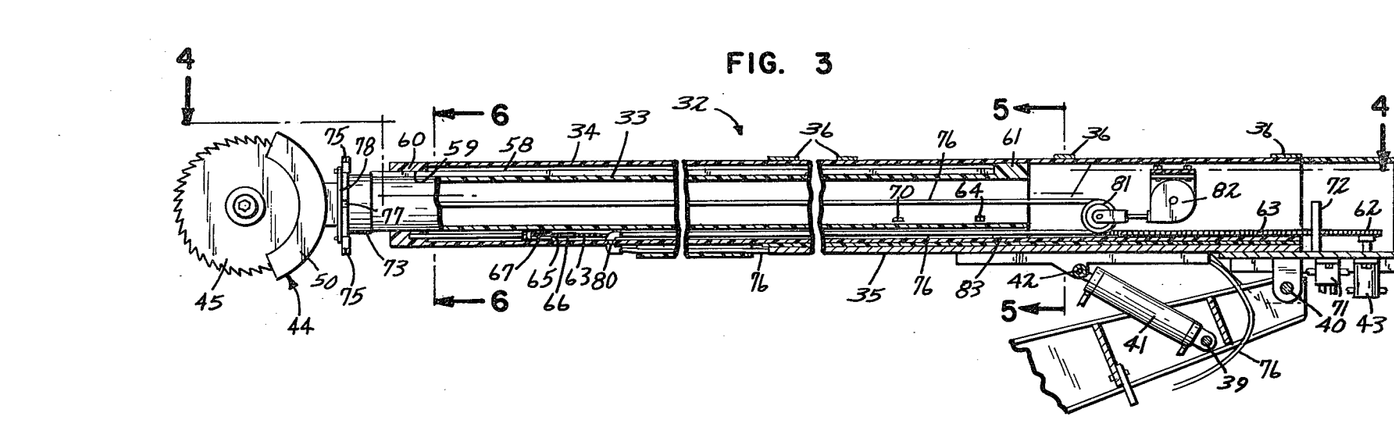
FIG. 3 is a partial transverse section of the boom broken away showing the relationship of the boom sections and the boom extending and retracting mechanism.
Figure 4:
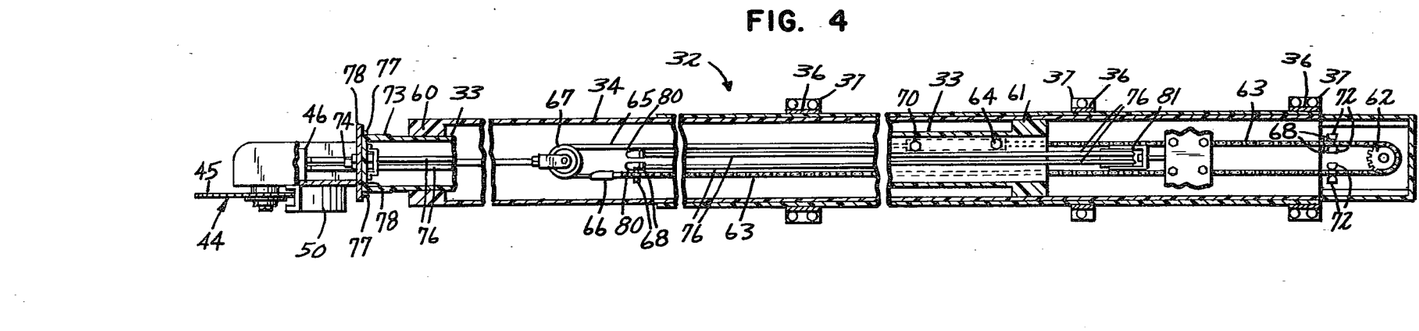
FIG. 4 is a sectional view of the boom taken generally along line 4—4 of FIG. 3.

Boom retracting and extending movements are imparted by way of hydraulic motor 43 which is firmly attached to boom carriage 35. A sprocket 62 is attached to the end of the shaft of hydraulic motor 43. Sprocket 62 engages a length of chain 63. One end of chain 63 is firmly affixed to inner boom member 33 at point 64. The other end of chain 63 is affixed to a high strength cable 65 at connector 66. Cable 65 is threaded through pulley 67 and then connected to inner boom member 33 at point 70. From these connections it can be seen that as hydraulic motor 43 is operated in the direction of boom extension sprocket 62 will engage chain 63, causing inner boom member 33 to move outwardly from within outer boom member 34. If hydraulic motor 43 is caused to operate in the opposite direction inner boom member 33 will be caused to retract into outer boom member 34.

The boom extension and retraction movements are controlled by an operator from operator's station 26. However, there is also a mechanically actuated control which prevents the boom from either extending or retracting too far. This mechanical control is provided by valves 71 mounted on boom carriage 35. One of valves 71 is connected in the conduit supplying fluid to power the forward rotation of motor 47 and the other is connected in the conduit supplying fluid to power the reverse rotation of motor 47. Each of valves 71 has a pair of arms 72 between which chain 63 is positioned. Chain 63 will move freely between each pair of arms 72 as the boom is either extended or retracted. Trip elements 68 are attached to chain 63 and positioned so that when the boom is either extended or retracted to the maximum desirable extent one of the trip elements will trip one of arms 72, closing the associated valve 71. This will shut off the flow of hydraulic fluid to motor 43 in either the forward or the reverse direction depending upon which of valves 71 is closed.

Figure 6:
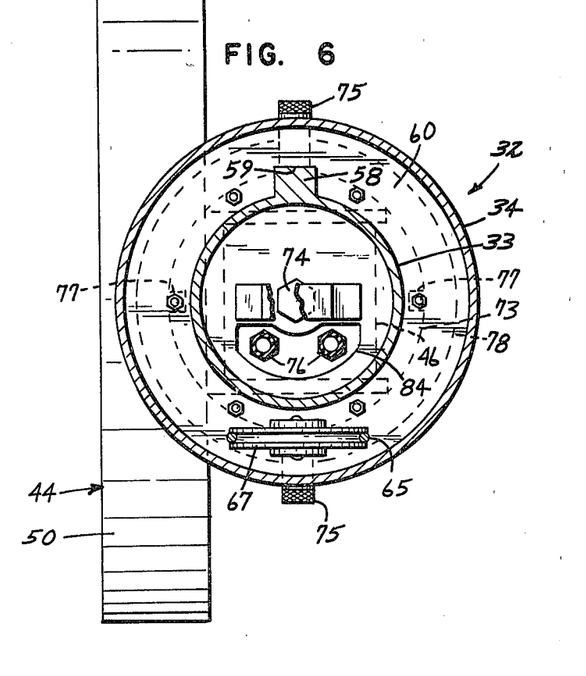
FIG. 6 is a cross-sectional view of the boom taken generally along line 6—6 of FIG. 3.

Cutting assembly 44 is mounted on the end of inner boom member 33 by means of a mounting cap 73. Mounting cap 73 fits over the end of inner boom member 33 and may be secured in place in any conventional manner. Cutting assembly 44 is secured to mounting plate 78, which is rotatably secured to end cap 73 about a bolt 74 which, as seen in FIG. 6, extends through aligning openings in mounting cap 73 and mounting plate 78. The cutting assembly 44 is held in place by spring loaded locking pins 75, which are mounted on mounting plate 78. Mounting cap 73 is provided with grooves 77 which mate with locking pins 75 in order to lock cutting assembly 44 in the desired position. In the drawing the cutting assembly 44 is shown locked in a vertical position. The cutting assembly 44 can be rotated 90° by releasing the locking pins 75 and manually rotating the cutting assembly 44. Additional grooves 77 are provided in mounting cap 73 so that locking pins 75 will lock the cutting assembly 44 in a horizontal position.

Circular saw 45 is powered by hydraulic motor 46. Hydraulic motor 46 is supplied with fluid under pressure from pump 21 through hydraulic conduit 76 as seen in FIGS. 3-6. Conduit members 76 travel from pump 21 along the external underside of outer boom member 34 to openings 80 where they enter the boom and lie between inner boom member 33 and outer boom member 34. Conduit members 76 then double back along the internal underside of outer boom member 34 and travel through arcuate slot 83 in bearing member 61. They are then threaded through pulley 81 and travel the rest of the way to motor 46 inside inner boom member 33.

In order to eliminate the possibility that conduit members 76 might interfere with boom extension and retraction movements, conduit members 76 are strung through a spring loaded pulley 81 which is connected to a spring rewind 82 which is mounted to the inner surface of outer boom member 34. During boom extending movements spring loaded pulley 81 allows conduit members 76 to move outwardly with inner boom member 33. Thus, the proper conduit length and tension is always maintained and the risk of conduit failure is kept to a minimum.

In the preferred embodiment of the invention the cutting efficiency of the tree-trimming apparatus is greatly enhanced by using a high speed motor 46 to drive a large diameter circular saw 45. For example, in the preferred embodiment, motor 46 produces 5000 rpm driving circular saw 45, which is 18 inches in diameter. This combination provides a blade tooth speed of about 265 mph. This high tooth speed allows even larger diameter limbs to be cut quickly and with ease.

Figure 5:
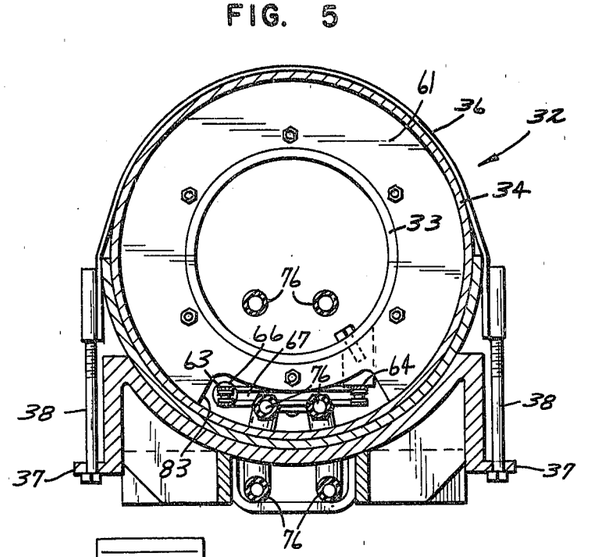
FIG. 5 is a cross-sectional view of the boom taken generally along line 5—5 of FIG. 3.

In FIGS. 5 and 6 the position of conduit members 76 with respect to inner boom member 33 and outer boom member 34 can be seen. An arcuate slot 83 is left in bearing member 61 to allow conduit members 76, chain 63, and cable 65 to pass freely. FIG. 6 shows the position of conduit members 76 inside inner boom member 33. Conduit members 76 enter cutting assembly 44 through an opening 84 in end cap 73.

Figure 8:
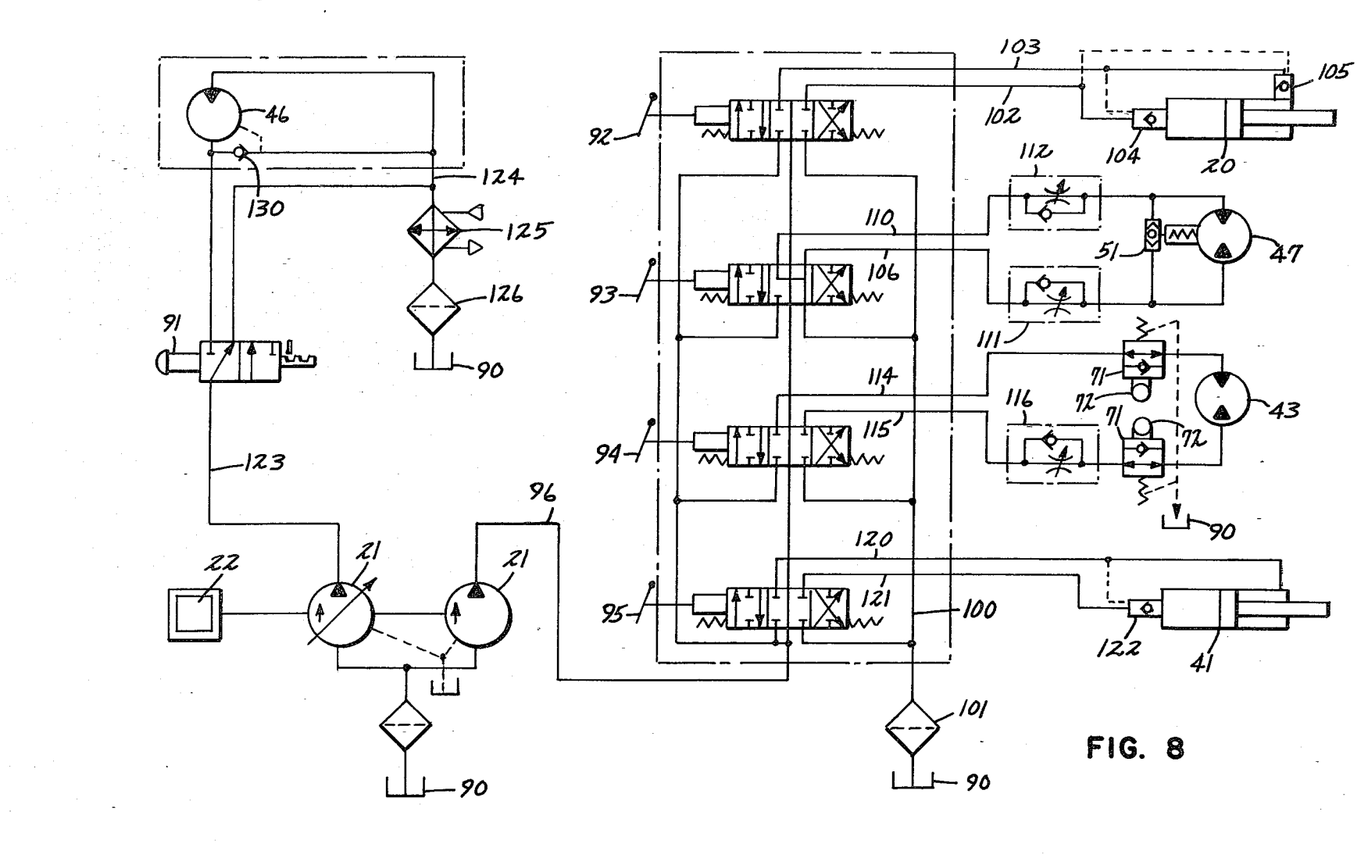
FIG. 8 is a schematic of the hydraulic system which powers the tree-trimming apparatus.

The operation of the tree-trimming apparatus can be understood with reference to FIG. 8, which is a schematic diagram of the hydraulic circuit used to operate and control the tree-trimming apparatus. The system is supplied with fluid under pressure from pump 21, which, in the preferred embodiment, is a pair of stacked pumps. Stacked pumps 21 are driven by an internal combustion engine 22. In the preferred embodiment of the invention engine 22 is a diesel engine. Hydraulic fluid is supplied from reservoir 90, which is located inside the base of pedestal 14. Five control elements which are located on control panel 30 are included in the circuit. These are push button 91, and control levers 92, 93, 94, and 95. Control levers 92-95 control the various positioning movements of the boom by mechanically varying the position of a four-way control valve which is associated with each lever. Their fluid pressure supply is delivered by way of conduit 96. Conduit 100 returns the fluid to the reservoir through filter 101.

Control lever 92 operates cylinder 20 which varies the degree of tilt of pedestal 14. Fluid is supplied to cylinder and piston 20 by means of conduits 102 and 103. In the preferred embodiment, cylinder 20 will tilt pedestal 14 up to 20° in either direction. As an added safety feature, cylinder 20 is provided with load check valves 104 and 105. Under normal operaing conditions fluid will be freely supplied to cylinder 20 through conduits 102 and 103. However, if for any reason there is a loss of fluid pressure in either conduit 102 or 103, this will be sensed by load check valves 104 and 105 and they will close and safely keep the tilt position of the pedestal stationary.

Control lever 93 controls the operation of hydraulic motor 47 which powers the rotation of turntable 12. Fluid is supplied to motor 47 through conduits 106 and 110. Hydraulic motor 47 is a reversible motor and allows the turntable 12 to rotate in either direction. Flow controls 111 and 112 are provided in conduits 106 and 110 and can be adjusted in order to control the response of motor 47 to the operation of control lever 93. As an added safety precaution a spring-loaded pressure off brake 51 is connected between conduits 110 and 106. As previously discussed, when motor 47 is off or should a pressure failure occur brake 51 will be applied and the rotation of turntable 12 will automatically stop. This ensures that under conditions where a conduit failure occurs or where the apparatus is used on uneven ground there will be no uncontrollable rotation of turntable 12.

Hydraulic motor 43 which powers the extension and retraction of boom 32 is operated by control lever 94. Fluid is supplied to hydraulic motor 43 through conduits 114 and 115. A flow control 116 is provided in conduit 115 and allows the operator to control the response of motor 43 to control lever 94. Flow control 116 is located so that it is within reach of the operator in order to allow the operator to adjust the response as he is operating the tree-trimming apparatus. Mechanically actuated valves 71 are provided in conduits 114 and 115. As previously discussed, valves 71 are activated by trip elements 68 connected to chain 63. By setting the trip elements in the proper position on chain 63, the maximum amount of extension and retraction of the boom can be set.

The boom elevation is controlled by lever 95 which operates cylinder 41. Fluid is supplied to cylinder 41 through conduits 120 and 121. Cylinder 41 is provided with a load check valve 122 to ensure safe operation of the boom. If for any reason load check valve 122 senses a pressure failure, it will close, keeping the elevation of the boom stationary. Without this feature, a conduit failure could cause the boom elevation to drop rapidly, creating a hazardous situation.

Push button 91 is used to activate hydraulic motor 46, which powers circular saw 45. Push button 91 is connected to stack pumps 21 through conduit 123. A discharge conduit 124 connects hydraulic motor 46 to reservoir 90 through a fluid cooling heat exchanger 125 and a filter 126. A special flow sensing valve 130 is provided to ensure the proper operation and safety of the system. When push button 91 is on, valve 130 is closed and hydraulic motor 46 receives fluid flow through conduit 131. In the preferred embodiment circular saw 45 has a large diameter, for example, 18 inches. Also, hydraulic motor 46 is a high-speed motor providing a tooth speed of approximately 265 miles per hour. The combination of high tooth speed and large saw blade provides a high inertia for circular saw 45. Consequently, when push button 91 is turned off, stopping the supply of fluid from pump 21, the large intertial force acting on motor 46 from circular saw 45 will cause motor 46 to continue its rotation and cause it to act like a pump. Flow sensing valve 130 senses the change of pressure due to the closing of push button 91 and opens the path through conduit 132. This provides a closed loop through which motor 46 can harmlessly pump fluid. If not for the presence of flow sensing valve 130, the pumping action of motor 46 would cause it to draw a vacuum in conduit 131 strong enough to cause conduit failure or damage.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent extended by the broad general meaning of the terms in which the appended claims are expressed.

What is claimed is:

1. A tree-trimming apparatus comprising:
a mobile support;
a turntable mounted about a substantially vertical axis on said support;
means for imparting rotational motion to said turntable about said vertical axis;
a pedestal pivotally mounted about a substantially horizontal axis on said turntable;
means for imparting pivotal motion to said pedestal about said horizontal axis;
a boom pivotally mounted on said pedestal about an axis normal to said horizontal axis;
means for imparting pivotal motion to said boom about said axis normal to said horizontal axis;
cutting means mounted on the end of said boom;
means for imparting cutting motion to said cutting means.

2. A tree-trimming apparatus according to claim 1 wherein said cutting means comprises a circular saw.

3. A tree-trimming apparatus according to claim 1 wherein said means for imparting rotational motion to said turntable comprises a fluid pressure operated motor operatively connected to said turntable, pump means for supplying fluid under pressure to said motor, and an engine drivingly connected to said pump means.

4. A tree-trimming apparatus according to claim 3 wherein said means for imparting pivotal motion to said pedestal comprises a fluid pressure operated cylinder mounted between said pedestal and said turntable, said cylinder operatively connected to said pump means.

5. A tree-trimming apparatus according to claim 3 wherein said means for imparting pivotal motion to said boom comprises a fluid pressure operated cylinder mounted between said boom and said pedestal, said cylinder operatively connected to said pump means.

6. A tree-trimming apparatus according to claim 3 wherein said means for imparting cutting motion to said cutting means comprises a fluid pressure operated motor mounted on the end of said boom and operatively connected to said pump means.

7. A tree-trimming apparatus according to claim 3 wherein said boom comprises at least two telescopic members and means for imparting boom extending and boom retracting movements to said telescopic members.

8. A tree-trimming apparatus according to claim 7 wherein said means for imparting boom extending and retracting movement comprises a fluid pressure operated motor connected to said telescopic members and operatively connected to said pump means.

9. A tree-trimming apparatus comprising:
a mobile support;
pump means for supplying fluid under pressure;

an engine drivingly connected to said pump means;
a turntable rotatably mounted about a vertical axis on said mobile support;
a first fluid pressure operated motor means operatively connected to said turntable for imparting rotational motion to said turntable about said vertical axis;
first conduit means for connecting said first motor means to said pump means;
a pedestal pivotally mounted about a horizontal axis on said turntable;
first fluid pressure operated cylinder means operatively connected between said pedestal and turntable for imparting pivotal motion to said pedestal about said horizontal axis;
second conduit means for connecting said first cylinder means to said pump means;
a boom comprising an inner boom member telescopically contained in an outer boom member, said boom pivotally mounted on said pedestal about an axis normal to said horizontal axis;
second fluid pressure operated cylinder means operatively connected between said boom and said pedestal for imparting pivotal motion to said boom about said axis normal to said horizontal axis;
third conduit means connecting said second cylinder means to said pump means;
second fluid pressure operated motor means operatively connected to said inner boom member for imparting boom extending and boom retracting movements to said inner boom member;
fourth conduit means for connecting said second motor means to said pump means;
a circular saw mounted on the end of said boom;
third pressure operated motor means operatively connected to said circular saw for imparting rotational cutting motion to said circular saw;
fifth conduit means for connecting said third motor means to said pump means.

10. A tree-trimming apparatus according to claim 9 wherein said pump means and said engine are mounted on said turntable.

11. A tree-trimming apparatus according to claim 9 wherein said first, second, third, fourth, and fifth conduit means are electrically non-conductive flexible hoses.

12. A tree-trimming apparatus according to claim 9 wherein said boom is comprised of a flexible, electrically non-conductive material.

13. A tree-trimming apparatus according to claim 9 further comprising an operator's station means mounted on said pedestal, said operator's station means operatively connected to provide control of said fluid pressure motor means and said cylinder means.

14. A tree-trimming apparatus according to claim 9 further comprising flow sensing means operatively connected to said fifth conduit means and said third pressure operated motor means for allowing the free flow of fluid through said motor means when the supply of fluid to said motor means is terminated, whereby said motor means is allowed to coast to a stop without drawing a vacuum in said conduit means.

15. A tree-trimming apparatus according to claim 12 wherein said inner boom member and said outer boom member are hollow and have a circular cross section.

16. A tree-trimming apparatus according to claim 15 wherein said fifth conduit means is contained within said boom.

17. A tree-trimming apparatus comprising:
a mobile support;
a turntable rotatably mounted about a vertical axis on said mobile support;
pump means mounted on said turntable for supplying fluid under pressure;
an engine mounted on said turntable and drivingly connected to said pump means;
a first fluid pressure operated motor means for imparting rotational motion to said turntable about said vertical axis, said motor means operatively connected to said pump means by flexible electrically non-conductive hoses;
a pedestal pivotally mounted about a horizontal axis on said turntable;
first fluid pressure operated cylinder means mounted between said pedestal and said turntable for imparting pivotal motion to said pedestal about said horizontal axis, said first cylinder means operatively connected to said pump means by flexible electrically non-conductive hoses;
a cylindrical boom constructed of fiberglass comprising an inner boom member telescopically contained in an outer boom member, said boom pivotally mounted on said pedestal about an axis normal to said horizontal axis;
second fluid pressure operated cylinder means mounted between said boom and said pedestal for imparting pivotal motion to said boom about said axis normal to said horizontal axis, said second cylinder means operatively connected to said pump means by flexible electrically non-conductive hoses;
a second fluid pressure operated motor means for imparting boom extending and boom retracting movements to said inner boom member, said second motor means operatively connected to said pump means by flexible electrically non-conductive hoses;
a circular saw mounted on the end of said boom, such circular saw having an unshielded circumferential surface of at least 240 degrees;
a third pressure operated motor means mounted at the end of said boom for imparting rotational cutting motion to said circular saw, said third motor means operatively connected to said pump means by flexible electrically non-conductive hoses which are contained inside said boom;
an operator's station means mounted on said pedestal, said operator's station means operatively connected to provide control of said fluid pressure motor means and said cylinder means.

18. A tree-trimming apparatus according to claim 17 further comprising a fluid reservoir located inside said pedestal, said reservoir connected to said pump means by flexible electrically non-conductive hoses.

19. A tree-trimming apparatus according to claim 17 further comprising first and second annular bearing members defined by a front edge, a rear edge, an inner circumferential surface and an outer circumferential surface, the outer circumferential surface of said first bearing member being secured to the inner cylindrical surface of said outer boom member, said inner boom member being slidably disposed within the opening defined by the inner circumferential surface of said first bearing member, the inner circumferential surface of said second bearing member being secured to the outer cylindrical surface of said inner boom member, said second bearing member being slidably disposed within said outer boom member, whereby during boom extending and retracting movements said boom members are allowed to move freely with respect to one another.

20. A tree-trimming apparatus according to claim 19 further comprising rotational alignment means operatively connected to said inner boom member and said outer boom member for eliminating the possibility of rotation between said boom members.

21. A tree-trimming apparatus according to claim 20 wherein said rotational alignment means comprises a longitudinal rotational alignment element secured to the outer cylindrical surface of said inner boom member and a keyway in said first bearing member which mates with said alignment member such that said boom members are allowed free movement in the longitudinal direction but are not allowed to move rotationally with respect to one another.

22. Apparatus for trimming trees and the like at above ground level, comprising:
support means;
a turntable mounted on the support means for rotational movement about a first axis that extends upwardly from the support means;
means for imparting rotational motion to said turntable about said first axis;
a pedestal mounted on the turntable for pivotal movement about a second generally horizontal axis;
means for imparting pivotal motion to said pedestal about said second axis;
a boom mounted on said pedestal for up and down pivotal movement about a third axis that is generally horizontal and transverse to said second axis;
means for imparting pivotal movement to the boom about said third axis;
cutting means mounted on the end of said boom;
and means for imparting cutting motion to said cutting means.

23. The apparatus defined by claim 22, wherein the boom is formed from flexible, electrically nonconductive material.

24. The apparatus defined by claim 23, wherein the cutting means comprises a circular saw blade.

25. The apparatus defined by claim 24, which further comprises shielding means for the circular saw blade, said shielding means being constructed to shield no more than about 120 degrees of the circumferential cutting edge of the blade.

26. The apparatus defined by claim 22, wherein the saw blade has a tip velocity of on the order of 265 miles per hour.

27. The apparatus defined by claim 22, wherein the blade is on the order of 18 inches in diameter.

28. The apparatus defined by claim 22, wherein the support means comprises a mobile support.

29. The apparatus defined by claim 22, wherein the boom comprises at least two telescopic members and means for imparting boom extending and boom retracting movements to said telescopic members.

30. Apparatus for trimming trees and the like at above ground level, comprising:
support means;
a turntable mounted on the support means for rotational movement about a first axis that extends upwardly from the support means;
means for imparting rotational motion to said turntable about said axis;
a boom mounted on said turntable for up and down pivotal movement about a second axis that extends generally horizontally, said boom being formed from flexible, electrically nonconductive material;
means for imparting pivotal movement to the boom about said second axis;
cutting means mounted on the end of said boom;
and means for imparting cutting motion to said cutting means.

31. The apparatus defined by claim 30, wherein the cutting means comprises a circular saw blade.

32. The apparatus defined by claim 31, which further comprises shielding means for the circular saw blade, said shielding means being constructed to shield no more than about 120 degrees of the circumferential cutting edge of the blade.

33. The apparatus defined by claim 30, wherein the support means comprises a mobile support.

34. The apparatus defined by claim 30, wherein the boom comprises at least two telescopic members and means for imparting boom extending and boom retracting movements to said telescopic members.

35. Apparatus for trimming trees and the like at above ground level, comprising:
support means;
a boom mounted on the support means for up and down movement relative thereto, the boom being constructed from flexible, electrically nonconductive material;
a circular saw blade mounted for cutting rotation at the extreme end of the boom;
fluid motor means carried by the boom for rotating the saw blade;
fluid pumping means on said support means for driving the fluid motor means;
and electrically, nonconductive fluid conduit means for transmitting fluid between the fluid pumping means and fluid motor means.

36. The apparatus defined by claim 35, wherein the boom is hollow, and the fluid conduit means is disposed within the boom.

37. The apparatus defined by claim 35, which further comprises shielding means for the circular saw blade, said shielding means being constructed to shield no more than about 120 degrees of the circumferential cutting edge of the blade.

38. The apparatus defined by claim 35, wherein the support means comprises a mobile support.

39. The apparatus defined by claim 35, wherein the boom comprises at least two telescopic members and means for imparting boom extending and boom retracting movements to said telescopic members.

40. Apparatus for trimming trees and the like at above ground level, comprising:
support means;
a boom mounted on the support means for up and down movement relative thereto about a predetermined axis, the boom being constructed from flexible, electrically nonconductive material;
means for imparting movement to the boom about said predetermined axis;
a circular saw blade mounted for cutting rotation at the extreme end of the boom;
shielding means for the circular saw blade carried by the boom constructed to shield no more than about 120 degrees of the circumferential cutting edge of the blade;

and means for imparting rotational cutting motion to the circular saw blade.

41. The apparatus defined by claim 40, wherein the saw blade has a tip velocity of on the order of 265 miles per hour.

42. The apparatus defined by claim 41, wherein the circular saw blade is on the order of 18 inches in diameter.

43. The apparatus defined by claim 40, wherein the support means comprises a mobile support.

44. The apparatus defined by claim 40, wherein the boom comprises at least two telescopic members and means for imparting boom extending and boom retracting movements to said telescopic members.

* * * * *